United States Patent
Peel et al.

(10) Patent No.: US 8,085,936 B2
(45) Date of Patent: Dec. 27, 2011

(54) METHOD AND SYSTEM FOR CONTENT MANAGEMENT IN A SECURE COMMUNICATION SYSTEM

(75) Inventors: Christian Peel, Aurora (CA); Cuneyt Karul, Toronto (CA); Luke Corrigall, Toronto (CA)

(73) Assignee: Echoworx Corporation, Toronto, Ontario (CA)

( * ) Notice: Subject to any disclaimer, the term of this patent is extended or adjusted under 35 U.S.C. 154(b) by 1124 days.

(21) Appl. No.: 11/604,286

(22) Filed: Nov. 27, 2006

(65) Prior Publication Data
US 2008/0123854 A1    May 29, 2008

(51) Int. Cl.
*H04L 9/00* (2006.01)
*G06F 15/16* (2006.01)
(52) U.S. Cl. .................................. 380/277; 709/229
(58) Field of Classification Search .............. 380/259, 380/277; 709/229, 225
See application file for complete search history.

(56) References Cited

U.S. PATENT DOCUMENTS

| | | | |
|---|---|---|---|
| 6,487,599 B1 * | 11/2002 | Smith et al. ................... | 709/229 |
| 6,684,248 B1 * | 1/2004 | Janacek et al. ................ | 709/225 |
| 7,333,616 B1 * | 2/2008 | Brettle et al. ................. | 380/277 |
| 7,562,150 B2 * | 7/2009 | Patterson ...................... | 709/229 |
| 2002/0007453 A1 * | 1/2002 | Nemovicher ................. | 713/155 |
| 2003/0172167 A1 * | 9/2003 | Judge et al. ................... | 709/229 |
| 2005/0114652 A1 | 5/2005 | Swedor et al. | |
| 2005/0182937 A1 * | 8/2005 | Bedi ............................. | 713/171 |
| 2008/0123850 A1 * | 5/2008 | Bhatnagar et al. ............ | 380/259 |

* cited by examiner

*Primary Examiner* — Nathan Flynn
*Assistant Examiner* — Abdullah Almamun
(74) *Attorney, Agent, or Firm* — William B. Vass; Bennett Jones LLP (57) ABSTRACT

A system and method for managing content for secure communications. The system includes an interface for receiving an encrypted message, a decryption module for decrypting the message into a clear text or other readable form and a key recovery module. The key recovery module recovers a key for the user associated with the encrypted message. The decryption module decrypts the message using the recovered key. The decrypted or clear text message is then routed or transferred for further processing or handling. The further processing includes policy enforcement, virus scanning, spam filtering and/or archiving.

27 Claims, 10 Drawing Sheets

SOAP Response

```
<?xml version="1.0"?>
<soap:Envelope                                              ← 501
  xmlns:soap="http://www.w3.org/2001/12/soap-envelope"
  soap:encodingStyle="http://www.w3.org/2001/12/soap-encoding">
    <soap:Body xmlns:m=" http://echoworx.com/SCM/Decrypt ">
        <m:GetDecryptedMessage>
            <m:MessageContent>              ← 503
Return-Path: <xu@echoworx.com>
Received: from smtp.echoworx.com (smtp.echoworx.com [38.112.89.7])
        by datal.echoworx.net (8.13.6/8.13.1) with ESMTP id kAAHtPa0017069
        for <dcdev1@datal.echoworx.net>; Fri, 10 Nov 2006 12:55:25 -0500
Received: from localhost (localhost [127.0.0.1])
        by smtp.echoworx.com (Postfix) with ESMTP id A06BA181EF
        for <dcdev1@datal.echoworx.net>; Fri, 10 Nov 2006 12:55:25 -0500 (EST)
Received: from smtp.echoworx.com ([127.0.0.1])
  by localhost (smtp [127.0.0.1]) (amavisd-new, port 10024) with ESMTP
  id 09288-09 for <dcdev1@datal.echoworx.net>;
  Fri, 10 Nov 2006 12:55:25 -0500 (EST)
Received: from exchange1.echoworx.local (unknown [172.20.20.94])
        by smtp.echoworx.com (Postfix) with ESMTP id 80B41181EA
        for <dcdev1@datal.echoworx.net>; Fri, 10 Nov 2006 12:55:25 -0500 (EST)
X-MimeOLE: Produced By Microsoft Exchange V6.5
Content-class: urn:content-classes:message
MIME-Version: 1.0
Content-Type: multipart/alternative;
        boundary="----_=_NextPart_001_01C704F1.79CCC5A8"
Subject: Normal Message
Date: Fri, 10 Nov 2006 12:55:57 -0500
Message-ID: <141470B890E6724A8DF578520D4D5CBE417D268@exchange1.echoworx.local>
X-MS-Has-Attach:
X-MS-TNEF-Correlator:
Thread-Topic: Normal Message
Thread-Index: AccE8Xj+BcPqcGsKRe2xPRBPaXOKvQ==
From: "James Xu" <xu@echoworx.com>
To: <dcdev1@datal.echoworx.net>
X-Virus-Scanned: by amavisd-new at echoworx.com
X-UIDL: h0%"!R2,!!B)@!!>=U!!
Status: U This is a multi-part message in MIME format.

------_=_NextPart_001_01C704F1.79CCC5A8
Content-Type: text/plain;
        charset="US-ASCII"
Content-Transfer-Encoding: quoted-printable This is a secure message ------_=_NextPart_001_01C704F1.79CCC5A8
Content-Type: text/html;
        charset="US-ASCII"
Content-Transfer-Encoding: quoted-printable <!DOCTYPE HTML PUBLIC "-//W3C//DTD HTML 4.0 Transitional//EN">
<HTML><HEAD>
<META http-equiv=3DContent-Type content=3D"text/html; =
charset=3Dus-ascii">
<META content=3D"MSHTML 6.00.2900.2963" name=3DGENERATOR></HEAD>
<BODY>
<DIV><SPAN class=3D800295517-10112006><FONT size=3D2>This is not a =
secure=20
message!</FONT></SPAN></DIV></BODY></HTML>

------_=_NextPart_001_01C704F1.79CCC5A8-
            </m:MessageContent>                ← 505
            <m:Exception></m:Exception>
        </m:GetDecryptedMessage>
    </soap:Body>
</soap:Envelope>
```

METHOD AND SYSTEM FOR CONTENT MANAGEMENT IN A SECURE COMMUNICATION SYSTEM

FIELD OF THE INVENTION

The present invention relates to electronic communication systems and more particularly, to a method and system for managing content for secure communications.

BACKGROUND OF THE INVENTION

Security concerns with electronic communications and in particular electronic mail or email have resulted in the development of various encryption platforms and techniques. One such technique comprises a peer-to-peer or end-to-end architecture where email is encrypted and maintained confidential from sender to recipient. In such a system, the confidentiality and integrity of the message is maintained.

Independently of security issues, a demand for monitoring and/or processing email communications has arisen, particularly in enterprise environments. Enterprises require performance of tasks such as policy enforcement, virus scanning and spam filtering, and compliance email archiving.

In order to maintain security, the performance of enterprise tasks, such as policy enforcement, cannot compromise the integrity of the peer-to-peer based encryption systems. Accordingly, there remains a need in the art.

SUMMARY OF THE INVENTION

The present invention provides a method and system for managing content in a secure communication network or system.

According to one aspect, the present invention provides a server for managing encrypted messages in a system having a key management server and a server for sending and receiving encrypted messages and a message content manager for processing messages, the server comprises: an interface for receiving an encrypted message from the message content manager; a key module for storing a plurality of keys from the key management server, the keys are associated with users on the message server; a decryption module for decrypting the encrypted message into a decrypted message, the decryption module utilizes one of the keys for the user associated with the encrypted message; and an interface for transmitting the decrypted message to the message content manager for further processing.

According to another aspect, the present invention provides an apparatus for managing secure messages in a communication system, the apparatus comprises: means for capturing one or more of the secure email messages in the communication system; means for associating a key with the secure messages; means for converting said captured secure message into a readable form using the key; means for processing the converted secure message.

According to yet another aspect, the present invention provides a method for processing encrypted messages for policy enforcement in a communication system, the method comprises the steps of: capturing an encrypted message in the communication system; recovering and associating a key with the captured encrypted message; using the key to convert the captured encrypted message into a message with readable content; managing the message based on the readable content.

According to a further aspect, the present invention provides a system for processing encrypted messages in a communication system having a message server for sending and receiving encrypted messages and a message processor, the system comprises: a monitor for monitoring messages from the message server and a module for capturing one or more of the messages; a decryption engine for decrypting the captured email messages into corresponding clear text email messages; a router for routing one or more of the clear text messages to the message processor for further processing.

According to yet another aspect, the present provides a storage medium having stored therein executable commands for execution on a processor when executing the commands in a communication system for performing: capturing an encrypted message from the communication system; recovering one or more keys for users of the communication system; associating one of the keys with the user for the captured encrypted message; using the key to convert said captured encrypted message into a readable message; and forwarding the readable email message for further processing.

Other aspects and features of the present invention will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example, embodiments of the present invention, and in which:

FIG. 5(a) shows in diagrammatic form an exemplary request message structure for the web service interface of FIG. 1;

FIG. 5(b) shows in diagrammatic form an exemplary response message structure for the web service interface of FIG. 1;

Like reference numerals indicate like or corresponding elements in the drawings.

DETAILED DESCRIPTION OF THE EMBODIMENTS OF THE INVENTION

Figure 1:
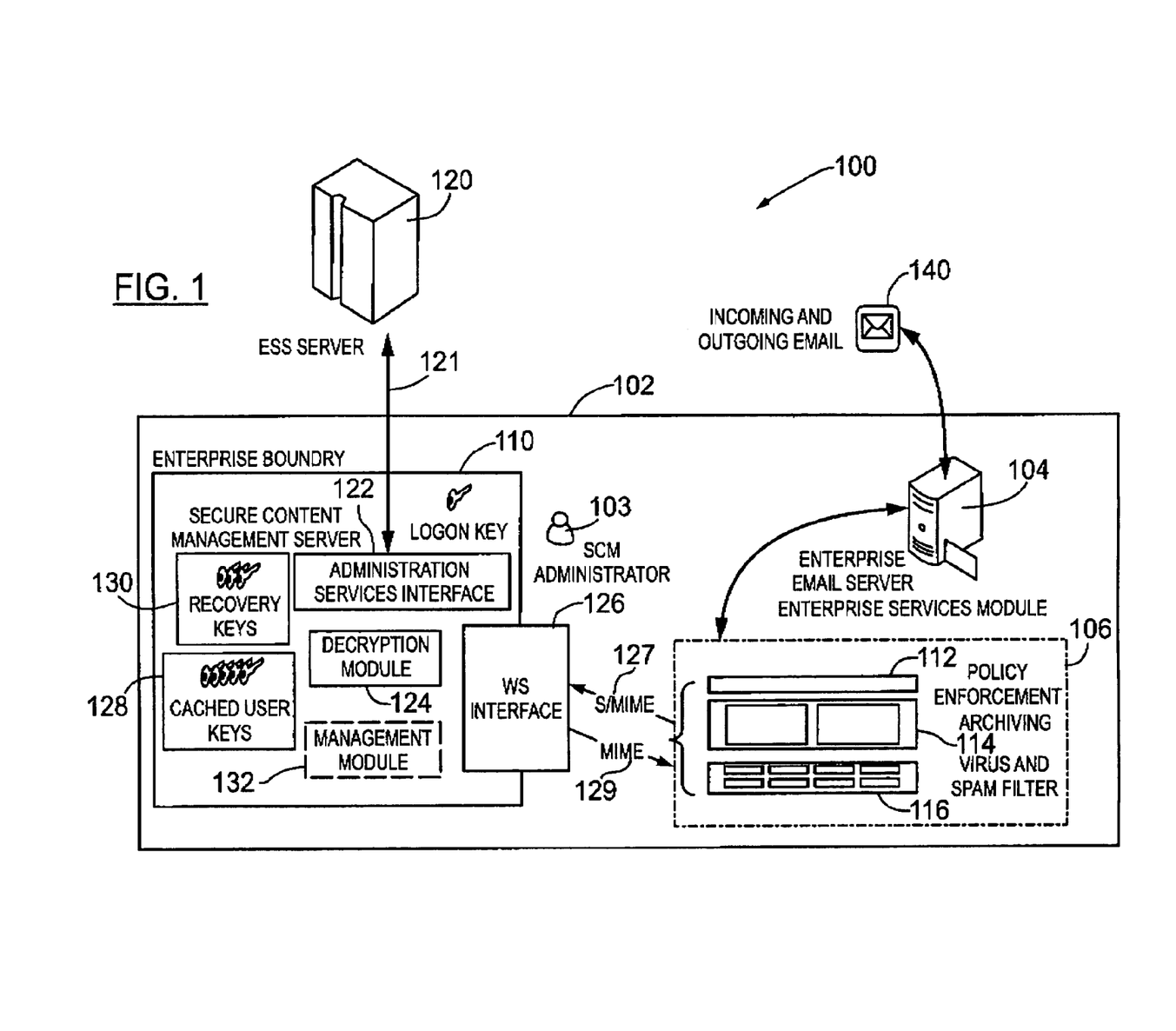
FIG. 1 shows in diagrammatic form an exemplary communication network for an enterprise operating a peer-to-peer security platform and including a content management mechanism according to an embodiment of the invention.

Reference is first made to FIG. 1, which shows in diagrammatic form an exemplary communication system 100 for an enterprise denoted generally by reference 102. The enterprise 102 comprises an information technology (IT) infrastructure which includes an enterprise email server 104 and an enterprise services or processing module 106. According to an embodiment of the invention, a secure content management server 110 is deployed within the IT infrastructure of the enterprise 102. According to another embodiment, the SCM 110 may be deployed at a service provider, an Internet service provider (e.g. an "instance" of a provider), or another remote location, such as an archiving facility. According to another embodiment, the SCM 110 may be implemented as a stand-alone system or appliance, or the SCM 110 may be implemented as an integrated component in an appliance, (for example, a software program or suite from another manufacturer), either remotely or locally at the enterprise location. As will be described in more detail below, the enterprise services module 106 may comprise a policy enforcement component (e.g. server) indicated by reference 112, an archiving component or server indicated by reference 114, and/or a virus and spam filter component or server 116. As shown in FIG. 1, the secure content management server 110 interfaces to a key management module or server indicated generally by reference 120. Where applicable to implementation examples, the embodiments of the present invention are described in the context of a peer-to-peer (i.e. end-to-end) encryption system for email based on the Echoworx Secure Suite™, available from Echoworx Corporation, 4101 Yonge Street, Suite 708, Toronto, Ontario, CANADA M2P 1N6. It is also to be appreciated that while embodiments according to the present invention are described in the context of a secure email system with end-to-end encryption, the present invention finds application according to the present and other embodiments to different types of secured content messaging and communication systems, such as for example, Instant Messaging or IM.

As shown in FIG. 1, the secure content management server (SCM) 110 comprises an administrative services interface 122, a decryption module 124 and an interface 126. According to an embodiment, the secure content management server 110 includes a memory or cache for storing cached user keys, indicated generally by reference 128. The secure content management server 110 may also include memory storage for recovery keys, indicated generally by reference 130. According to another embodiment, the secure content management server 110 may also include a management module 132 as described in more detail below. According to an embodiment, the secure content management server 110 comprises a Web service and is implemented utilizing an interface based on SOAP technologies. According to another embodiment, the secure content management server 110 may be implemented as a service with an API (Application Program Interface). The functions and operations of the SCM server 110 are described in more detail below, and the particular SOAP implementation details will be within the understanding of those skilled in the art.

The administrative services interface 122 in the SCM server 110 provides a communication interface to the key management server 120 over a secure communication link or channel indicated by reference 121. For an embodiment with the key management server 120 comprising the Echoworx ESS server, the administrative services interface 122 comprises a command-line implementation, or an API implementation, and the SCM server 110 is associated with a "SCM Administration" key on the ESS server (i.e. server 120) for authentication and authorization, which are assigned to a SCM administrator indicated by reference 103. In one implementation, the SCM server 110 utilizes an instance of the administrative services interface 122 to connect to the ESS server 120 over the secure link 121. The administrator (e.g. the enterprise administrator 103) for the SCM server 110 is provided with an authentication key in order to use the administrative services interface 122 and have access to the ESS server 120. In a typical implementation, the enterprise administrator 103 will have an identity for the administrative services interface 122 and the administrator logs onto the administrative services interface 122 with a device containing the administrator's authentication key, for example, a secure removable drive.

For a Web based implementation, the interface 126 comprises a Web Service interface 126, which provides an interface between the SCM server 110 and the enterprise services module 106 (i.e. the policy enforcement component 112, the archiving component or module 114, and the virus and spam filter 116). According to an embodiment, the SCM server 110 responds to a request (e.g. bulk or single requests) from the enterprise services module 106 to convert an encrypted email (e.g. S/MIME) into clear text email (e.g. MIME). The decryption module 124 receives S/MIME messages 127 and converts (i.e. decrypts) the S/MIME messages into corresponding clear text or MIME messages which are passed back 129 to the enterprise services module 106. The interface between the decryption module 124 and the enterprise services module 106 for transferring the S/MIME 127 and/or the MIME 129 messages may comprise a secure communication link or channel, for example, using SSL. The decryption module 124 includes a decryption engine for decrypting the S/MIME messages, which can be implemented in a manner readily apparent to one skilled in the art. According to another embodiment, the decryption engine comprises hardware accelerated encryption/decryption components, for example, "crypto card(s)". In accordance with an embodiment, the decryption module 124 utilizes encryption keys associated with users (i.e. "end-users") of the enterprise email server 104. According to an embodiment, the keys comprise a public-private key pair for each user and the keys are recovered (i.e. downloaded) from the ESS server 120, for example, as part of a startup sequence for the SCM server 110 as described in more detail below. According to another embodiment, the keys comprise key parts, and the key parts are downloaded and reconstituted on the SCM server 110, as described in more detail below. According to other embodiments, the keys or key parts are recovered or downloaded on an as-needed basis or as part of a background process. For increased performance, the user keys are stored or cached in the cache memory 128 for the SCM server 110 and used to decrypt email when possible. While the present embodiment is described in the context of S/MIME or Secure Multipurpose Internet Message Extension encrypted email and MIME or Multipurpose Internet Message Extension clear text email, it is to be appreciated that the invention has wider applicability to other encryption protocols or secure communication techniques.

As described above, the SCM server 110 includes memory 130 for storing recovery keys. The recovery keys are associated with the Recovery Authority for the ESS server 120 and comprise a minimum number of keys used for key recovery. The SCM server 110 also includes secure memory for storing the administrator username and key for the Administrative Services Interface 122, which are used in communications with the ESS server 120. According to another aspect, the Administrative Services Interface 122 includes a function or component (for example, running as part of the software) for deleting or otherwise eliminating sensitive information cached or stored in memory, for example, in response to a system reboot, power outage or a security breach. According to another embodiment, hardware crypto cards may be utilized to securely store keys, for example, in high-security installation.

According to another embodiment, the SCM server 110 may include the management module 132. The management module 132 interfaces to the decryption module 124 and includes a routing function. The management module 132 intercepts or otherwise acquires S/MIME message(s) and uses the decryption module 124 to convert the S/MIME message into a decrypted MIME message, and then routes the MIME message to one or more third party content management devices. According to another aspect, the management module 132 includes an exception handler for providing further processing or handling of email messages. The management module 132 according to an embodiment of the invention is described in more detail below with reference to FIGS. 7, 8 and 9.

The overall operation of the communication system 100 according an embodiment of the invention is as follows. Email messages, both incoming and outgoing, (indicated generally by reference 140 in FIG. 1) arrive at the enterprise email server 104. The enterprise services module 106 includes a software process or function (i.e. code components) for intercepting or otherwise capturing email traffic from the enterprise email server 104, for example, by journaling the email server 104, or by tracing the network email traffic. The captured email is then passed or transferred to the service(s) provided by the enterprise services module 106, for example, the policy enforcement component 112, the archiving component 114 and/or the virus and spam filter 116. According to this embodiment, the services in the enterprise services module 106 comprise content management systems, which include a capability (i.e. software process or function) for detecting an encrypted email, and once detected the software process calls or invokes the Web Services interface 126 and the full body of the encrypted (i.e. S/MIME) message 127 is transferred to the decryption module 124. An indication of whether of the email is incoming or outcoming may also be provided for decrypting the message. It is assumed that the communication 127, 129 between the enterprise services module 106 and the Web Service interface 126 is secure within the IT infrastructure of the enterprise 102. According to another embodiment, the communication 127, 129 may be deployed using a secure link or channel, for example, using a Secure Socket Layer or SSL implementation or other Web based authentication mechanisms as will be familiar to those skilled in the art.

It will be appreciated that the secure content management server is operable in a passive mode according to one embodiment and in an active mode according to another embodiment. In the passive mode of operation, the secure content management server functions in response to requests from content management systems (e.g. policy enforcement, archiving, virus and spam filter) to generate a MIME version of a S/MIME email message. Without the conversion, the encrypted email message would otherwise not be processed by the content management system(s). The active mode of operation comprises a management module according to an embodiment of the invention and is described in more detail below and with reference to FIGS. 7 to 9. The passive mode of operation is also possible by deactivating the management module.

Figure 2:
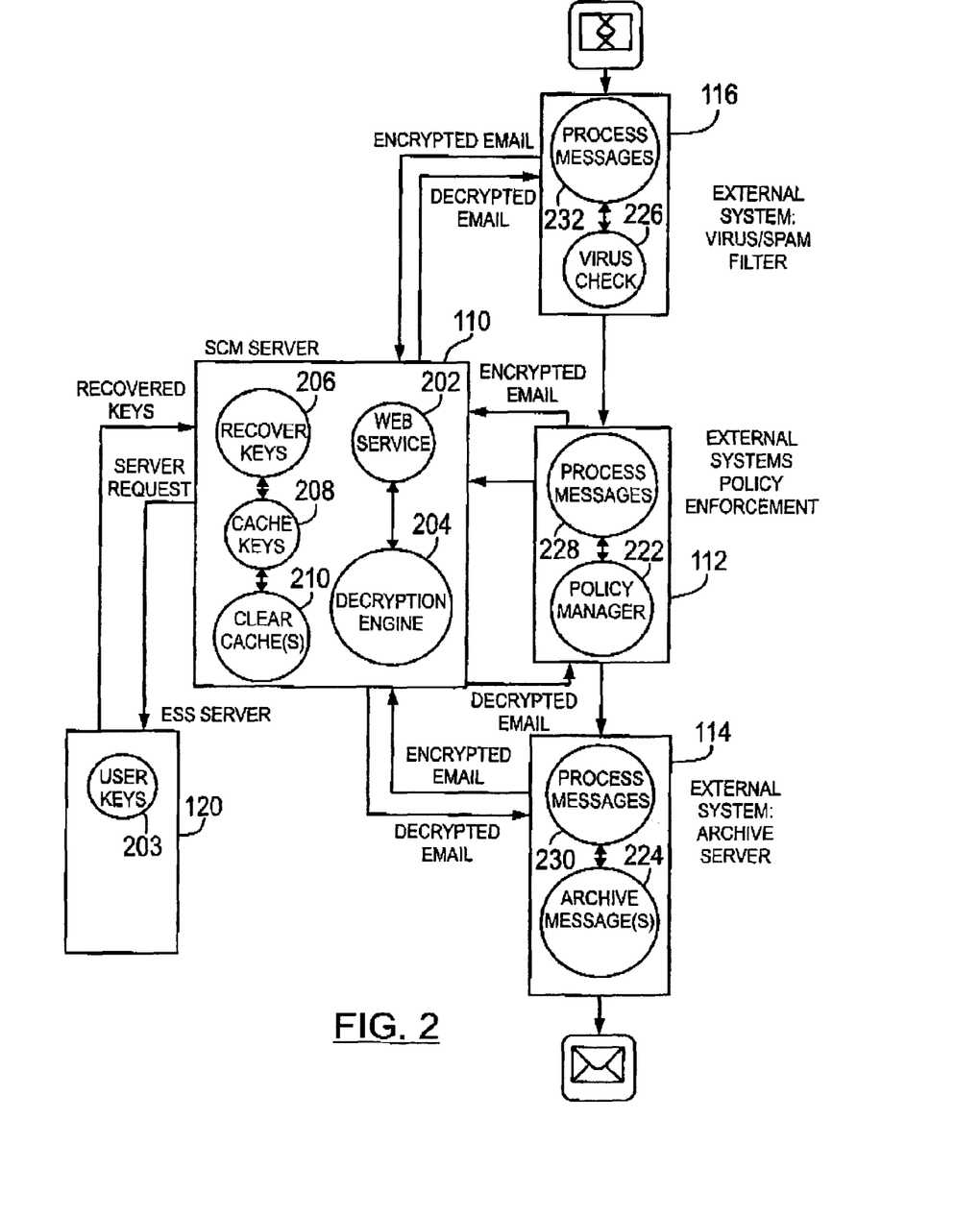
FIG. 2 shows in block diagram form an arrangement for the secure content management content server according to an embodiment of the invention.

Reference is next made to FIG. 2, which shows the secure content management server or SCM server 110 configured for a passive mode of operation according to an embodiment. As shown, the SCM server 110 is coupled to the policy enforcement module 112, the archiving system 114 and the virus and spam filter system 116. As shown in FIG. 2, the SCM server 110 includes representations of different software processes or functions and files local to the SCM server 110, which are represented as ovals in the drawing. Any suitable programming language may be used to implement such processes and files. For the purposes of the present description, the processes and files and the like will be collectively referred to as software objects or modules, though the use of the term "object" it is not to be construed in a limiting sense, such as being strictly limited to "software objects" referred to in object oriented programming languages. Further, while software objects are described according to an embodiment of the present invention, at least some or all of the software objects can be hard-coded into central processing units and/or read only memories or other non-volatile storage media in the SCM server 110 and other components or modules depicted in the drawings.

As shown in FIG. 2, the SCM server 110 includes a web service software module 202, a decryption engine software module 204, a recover keys software module 206, a cache keys software module 208 and a clear cache(s) software module 210. The web service module 202. As shown, the policy enforcement module 112 includes a policy manager software module 222, the archive server 114 includes an archive software module 224, and the virus and spam filter 116 includes a virus and spam software module 226. Each of the policy enforcement module 112, the archive server 114 and the virus and spam filter 116 include a process messages software module, indicated by reference 228, 230 and 232, respectively. In the policy enforcement module 112, the policy manager 222 is operable to apply "policies" or enterprise defined rules to user email. The rules for policy enforcement may be content based (e.g. blocking of messages containing sensitive or confidential enterprise information) or recipient based (e.g. email message is addressed to an unauthorized or unknown recipient). In the archive server 114, the archive software module 224 is operable to archive messages for storage and subsequent retrieval. In the virus and spam filter 116, the virus and spam software module 226 is operable to scan the messages for viruses (and take appropriate steps, e.g. quarantine) and block spam. For the external systems 112, 114, 116 to perform the desired functions or operations, the messages must in a readable or readily scannable form. According to this embodiment, the email messages comprise encrypted S/MIME emails, and they are converted by the SCM server 110 into clear text MIME email messages, as described in more detail below. The process messages module 222, 224, 226 in each of the external systems is operable to detect an encrypted message and forward the encrypted message to the SCM server 110 and generate a conversion or decryption request. The web service module 202 is operable to receive the encrypted message(s), e.g. S/MIME email, from any one of the external systems 112, 114, 116, and invoke the decryption engine 204 (e.g. in response to a conversion request). The decryption engine 204 is operable to convert the S/MIME email into a clear text MIME message, which is then transferred back to the external system by the web service module 202. The clear text MIME message is then available for policy enforcement, archiving and/or virus scanning and spam filtering.

In accordance with one embodiment, the decryption engine 204 utilizes end-user keys accessed or retrieved from the ESS server 120. The recover keys software module 206 is operable to retrieve end-user key parts from the ESS server 120. According to an embodiment, the end-user keys are stored or cached in memory in the SCM server 110 for ready access by the decryption engine 204 and increased performance. According to this aspect, the clear caches software module 210 is operable to delete or otherwise eliminate the end-user keys when they are no longer needed, for example, when the SCM server 110 is shut down. As shown in FIG. 2, the ESS server 120 includes a user keys software module 203. In response to a valid (e.g. authentic) request from the recover keys module 206 in the SCM server 110, the user keys module 203 sends back "key parts" (for example, an encrypted form of the user keys). The recover keys module 206 decrypts the key parts, for example, using a mathematical algorithm utilizing M of N of the recovery keys, as described in more detail below. According to one embodiment, the SCM server 110 recovers keys "on the fly" or "as needed", i.e. the recover keys module 206 requests the key parts for user(s) from the user keys module 203 on the ESS server 120 and processes them with previously obtained or cached recovery authority keys.

In an implementation of the system 100 utilizing an ESS server for the key management server 120, there are two procedures to recover or retrieve the private key(s) for a user. The first procedure comprises a user entering key recovery answers to one or more previously defined questions. The second procedure comprises escrowing the private key(s) for the user. In the context of one embodiment, the key recovery, e.g. the recover keys module described above with reference to FIG. 2, is based on key escrowing, and the SCM server 110 utilizes key escrowing in a key recovery procedure to recover keys for end-users, as described in more detail below.

When an end-user registers with the ESS server 120, two sets of keys are created as part of the registration process: (1) a cipher key pair (private and public); and (2) a signing key pair (private and public).

An end-user uses the signing key pair to sign the his/her email. In accordance with the non-repudiation principle of Public Key Infrastructure (PKI), the signing key pairs are not escrowed. The cipher key pairs, on the other hand, can be recovered under certain conditions from the ESS server by a number, e.g. quorum, of recovery authorities that have been previously registered in the system and are authorized to perform key recovery. During the creation of the cipher credentials for an end-user, the created private key is processed through a mathematical algorithm (in known manner) using the public keys of the recovery authorities and then saved on the ESS server 120 for subsequent key recovery. According to this aspect, the private key for an end-user is not usable unless a minimum number of recovery authorities use their respective keys to recover the private key for a recovery recipient, e.g. the SCM server 110 or the end-user associated with the private key. Key recovery typically involves two or more key authorities, a recovery recipient that receives the recovered (private) key, and a recovery manager that controls the recovery process.

According to one embodiment, the key recovery procedure (i.e. the recovery keys software object 206) for the SCM server 110 is implemented to provide the following functionality and features: (1) the key recovery procedure is performed once and the recovered private keys for the end-users are stored or cached in memory on the SCM server 110; (2) the credentials of the key recovery authorities are available to the SCM server 110 during boot-up; (3) the escrow process is not recorded or otherwise saved in memory; (4) email notifications are not sent to the key recovery authorities. According to one embodiment, the key recovery process is performed on the SCM server 110 utilizing key parts retrieved or recovered from the ESS server 120 using the administrative services interface 122 (FIG. 1). According to another embodiment, an API implementation is utilized for key recovery.

Figure 3:
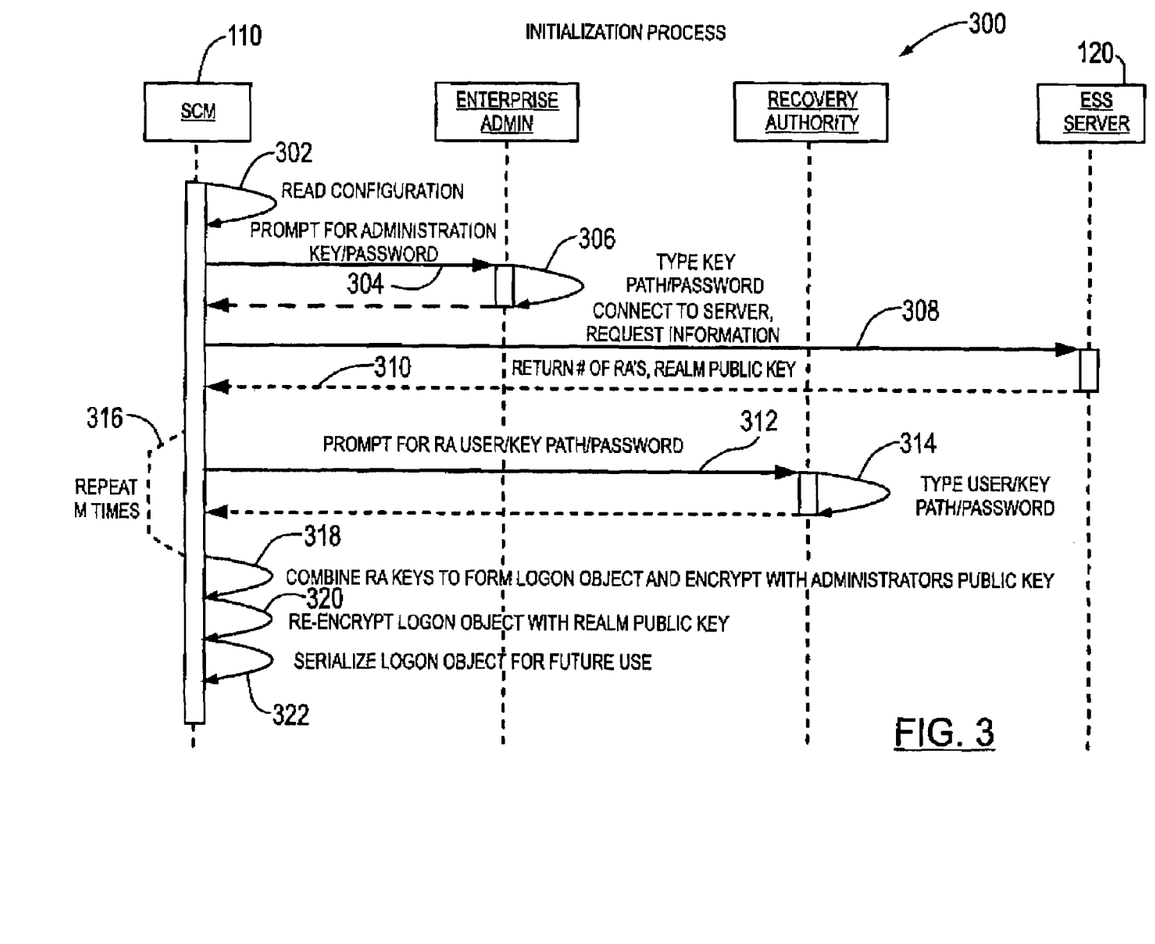
FIG. 3 shows an initialization process for the secure content management server according to an embodiment of the present invention.

Reference is next made to FIG. 3, which shows an initialization procedure for the SCM server 110 (FIG. 1) according to an embodiment of the invention and indicated generally by reference 300. The initialization procedure is implemented in one or more software objects or modules that run or are otherwise executed on the SCM server 110. The initialization procedure 300 typically takes place after the SCM server 110 has been deployed and the enterprise configuration completed, including creation of recovery authorities. Initialization starts with the SCM server 110 reading configuration parameters, such as the URL for the ESS server administration interface, and SCM administrator credentials, as indicated by 302. Next, as indicated by 304, the SCM server 110 prompts the SCM administrator to enter a password, e.g. using the command-line interface on the administration services interface 122 (FIG. 1), as indicated by 306. According to another embodiment, the password may be passed as a command line argument during startup. Using the provided administrator password, the configuration parameters and SCM administrator key, the SCM server 110 connects to the ESS server 120 (FIG. 1), as indicated by 308. As described above, the connection to the ESS server 120 is established over a secure communication layer or channel 121 (FIG. 1). For an ESS server implementation, once the connection is established the ESS server 120 sends the SCM server 110 the number of "managed recovery authorities" and the "realm public key", as indicated by 310. In response, the SCM server 110 prompts the recovery authorities to enter their user names (e.g. email addresses), key locations, and their passwords, as indicated by 312. According to one embodiment, this process is managed by the SCM administrator and the recovery authorities provide their credentials (e.g. on a removable storage media) and enter their passwords when requested by the administrator, as indicated by 314. The process is repeated at least M times, where M of N is the configured Managed Key Recovery parameter, for example, 2 if M=2 and N=3, 3 if M=3 and N=5. To avoid the need to repeat the process, for example, if the key for a recovery authority is found to be invalid, the process should involve more than M recovery authorities. Once the keys for the recovery authorities are entered, the SCM server 110 combines them, for example, in LOGON OBJECT format, and encrypts them using the public key of the SCM administrator, as indicated by 318. The SCM server 110 re-encrypts the LOGON OBJECT using a Realm public key, as indicated by 320. The SCM server 110 then serializes, i.e. writes, the encrypted LOGON OBJECT file to a hard disk or to a removable drive or storage media, which is then made available for the day-to-day startup process for the SCM server 110.

Figure 4:
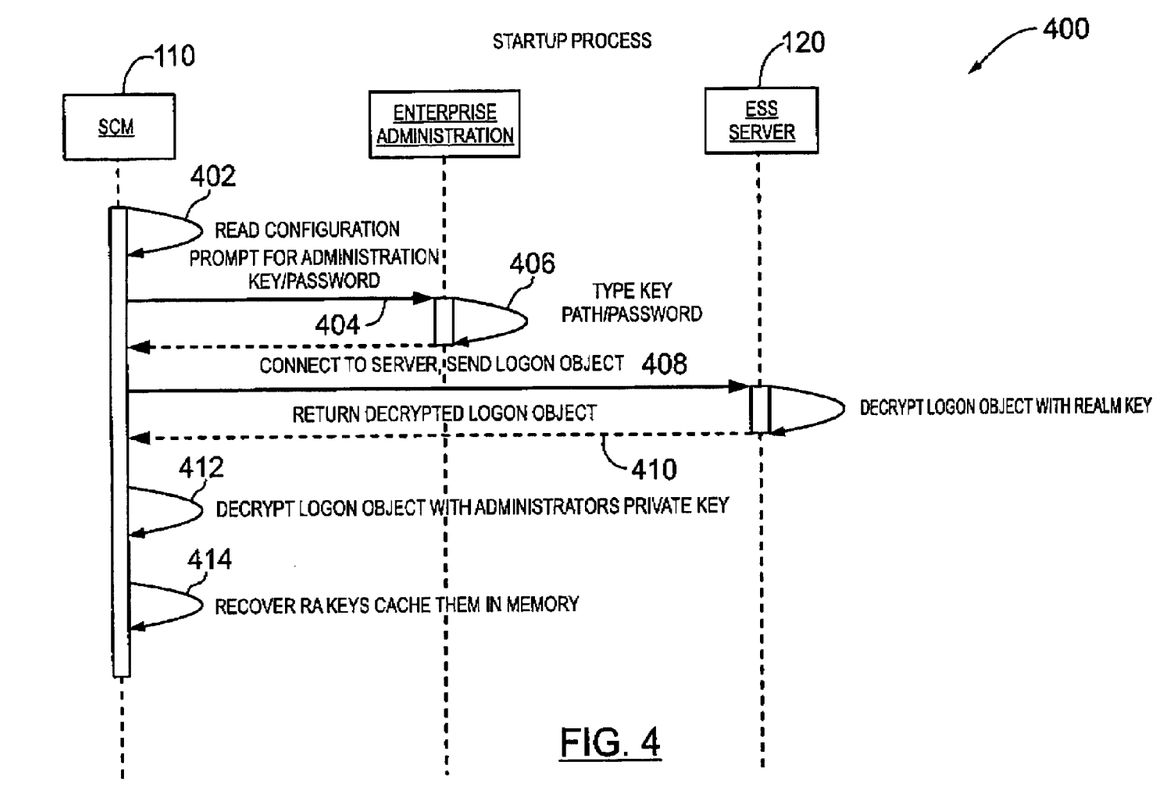
FIG. 4 shows a startup process for the secure content management server according to an embodiment of the present invention.

Reference is next made to FIG. 4, which shows a startup procedure for the SCM server 110 (FIG. 1) according to an embodiment of the invention and indicated generally by reference 400. The startup procedure 400 is implemented in one or more software objects or modules that run or are otherwise executed on the SCM server 110. The startup procedure 400 is typically executed whenever the SCM 110 server is restarted, for example, after power failure, maintenance, etc. The startup procedure 400 serves to authorize the ESS server 120 connection with the logon key/password for the administrator, and also loads the recovery authority keys to memory (for example, as indicated by 130 in FIG. 1). The startup procedure 400 starts with SCM server 110 reading the configuration parameters, for example, the URL for connection, the location of the credentials for the SCM administrator, as indicated by 402. The SCM server 110 then prompts the SCM administrator 103 to enter a password on the command-line interface of the SCM administration services interface 122

(FIG. 1), as indicated by 406. According to another embodiment, the password may be passed as a command-line argument during startup. Using the provided administrator password, the configuration parameters and SCM administrator key, the SCM server 110 connects to the ESS server 120 (as also shown in FIG. 1), as indicated by 408. Upon successful connection to the ESS server 120, the SCM server 110 sends the LOGON OBJECT file to the ESS server 120, as also indicated by 408. The ESS server 120 decrypts the LOGON OBJECT and sends a decrypted version back to the SCM server 110, as indicated by 410. The SCM server 110 decrypts the received LOGON OBJECT again using the private key of the SCM administrator, as indicated by 402. The decrypted LOGON OBJECT provides the keys for the recovery authorities in clear text. The SCM server 110 loads the recovery authority keys into memory (e.g. memory module 130 in FIG. 1). The SCM server 110 is now in a state ready to receive and process requests from the enterprises services module 106 (FIG. 1).

Reference is next made to FIGS. 5(a) and 5(b), which show an exemplary request and response structure for the web service interface 126 (FIG. 1) implemented using SOAP protocol. FIG. 5(a) shows an exemplary request message structure indicated generally by reference 500, and FIG. 5(b) shows an exemplary response message structure indicated by reference 501. The request 500 includes two arguments: a MessageContent field (indicated by reference 502 in FIG. 5(a)) and a MessageType field (indicated by reference 504 in FIG. 5(a)). According to one embodiment, the MessageContent field 502 comprises a BASE64 encoded version of the S/MIME message. The MessageType field 504 comprises a string declaring whether the message is incoming or outgoing. The MessageType field 504 is provided for determining the correct end-user key, which is then used to decrypt the message. The response 501 includes a MessageContent field, indicated by reference 503 in FIG. 5(b) and an Exception field, indicated by reference 505 in FIG. 5(b). The MessageContent field 503 comprises the decoded message (e.g. MIME). The response 501 returns the decrypted message (MME) encoded with BASE64 in the MessageContent field 503. If the request has failed, then the response returns an exception condition in the Exception field 505.

Figure 6:
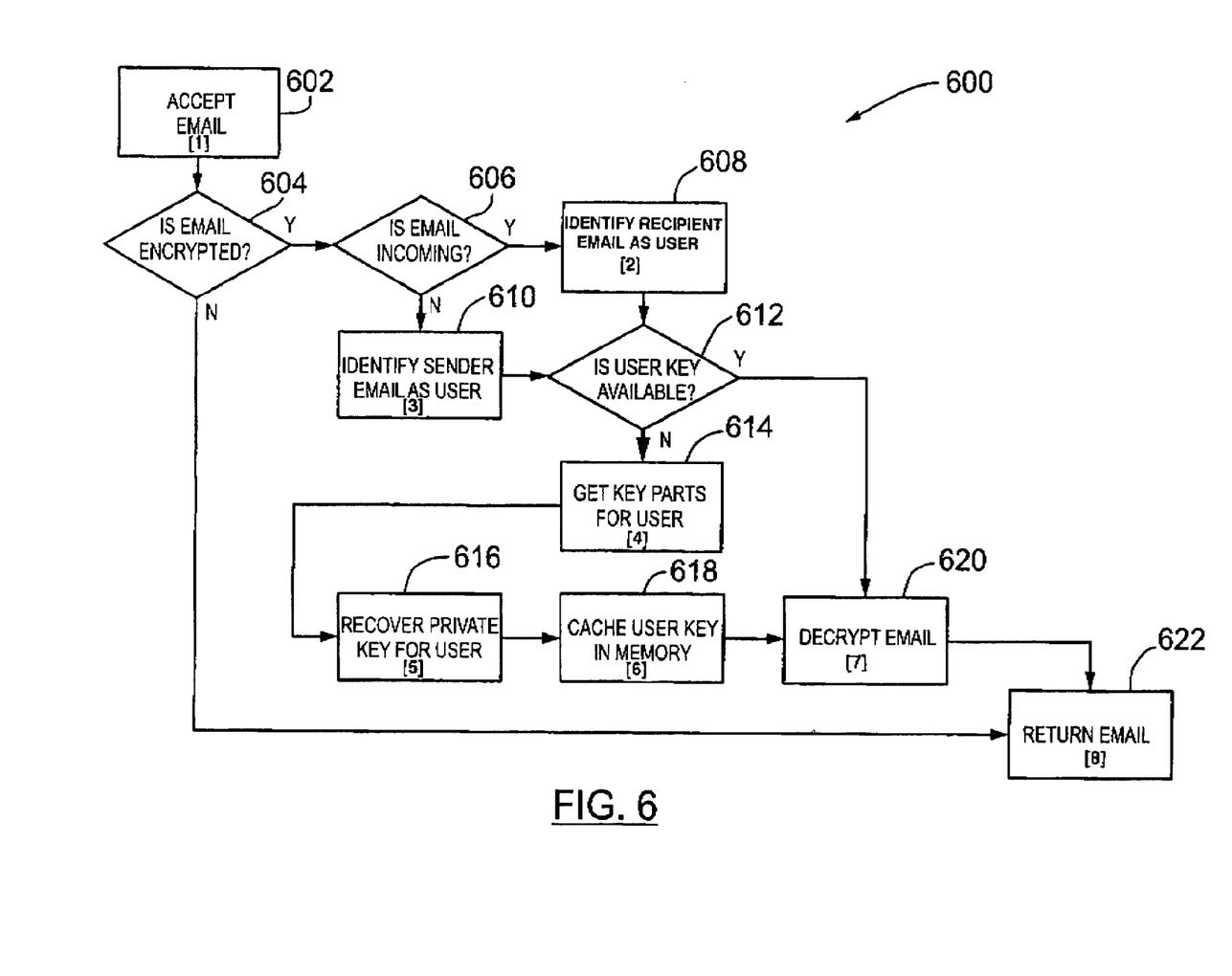
FIG. 6 shows in flowchart form a process for decrypting email for the secure content management service according to an embodiment of the invention.

Reference is next made to FIG. 6, which shows in flowchart form a process for handling encrypted messages according to an embodiment of the invention and indicated generally by reference 600. In order to assist in the description of the processing steps, it is assumed that they are performed using the system 100 (FIG. 1). Furthermore, the following description of the processing will lead to further understanding of the system 100 and in particular the SCM server 110 (FIG. 1) and its components. According to one embodiment, the process is implemented in software object(s) or module(s) in the decryption module 124 (FIG. 1) of the SCM server 110. It is however to be understood that the SCM server 110 and/or system 100 and/or processing steps can be varied, and need not work together exactly as described, and that such variations are within the scope of the invention. For example, the order of performance of various steps can be varied, and certain steps can be omitted and/or additional steps can be added as desired.

Referring to FIG. 6 and beginning at step 602, a message, e.g. an email, is received or accepted from a requester, for example, the enterprise services module 106 (FIG. 1). For example, according to a web service based implementation described above, the decryption module 124 (FIG. 1) receives a SOAP message with a BASE64 encoded S/MIME message contents and a message type indicator that identifies the message as incoming or outgoing (for example, as described above with reference to FIG. 5). The decryption module 124 executes a software object or module that converts the message to binary and sources the header information and message parts as specified by the S/MIME protocol. The software object can also verify whether the message is a valid S/MIME message and determine whether the message is incoming or outgoing. At step 604, a determination is made whether the email is encrypted. If the email is not encrypted (as determined at step 604), then the email is returned to the requester, i.e. it is treated as a decrypted message or MIME mail. If the email is encrypted, then a determination is made at step 606 whether the email is incoming. If the email is incoming, then at step 608 the decryption module 124 executes a software object that identifies or matches the recipient email address to a username in the ESS server 120 (FIG. 1). If the email is not incoming (as determined in step 606), then the decryption module 124 identifies or matches the sender address for the email to a username in the ESS server 120. Next, at step 612, the decryption module 124 determines if a user key for the identified username is stored or cached in memory. If a user key is not locally available or cached, then, at step 614, the decryption module 124 executes a software object for recovering the key. For an implementation based on the ESS server 120, the recovery process involves retrieving 'key parts' for the user from the ESS server 120. Next, at step 616, the decryption module 124 executes a software object which utilizes the retrieved key parts and the recovery authority keys (loaded in memory 130 during startup of the SCM server 110) to generate the private-key associated with the identified username. The decryption module 124 then executes a software object to store or cache the private-key for the user in memory, as indicated at step 618. Next, at step 620, the decryption module 124 executes a software object (e.g. a decryption engine) that decrypts the email using an encryption key pair comprising the private-key and a specified public key. The decryption module 124 then executes a software object to return or transfer the decrypted email message to the requester via the web service interface 126 (FIG. 1), as indicated at step 622.

Figure 7:
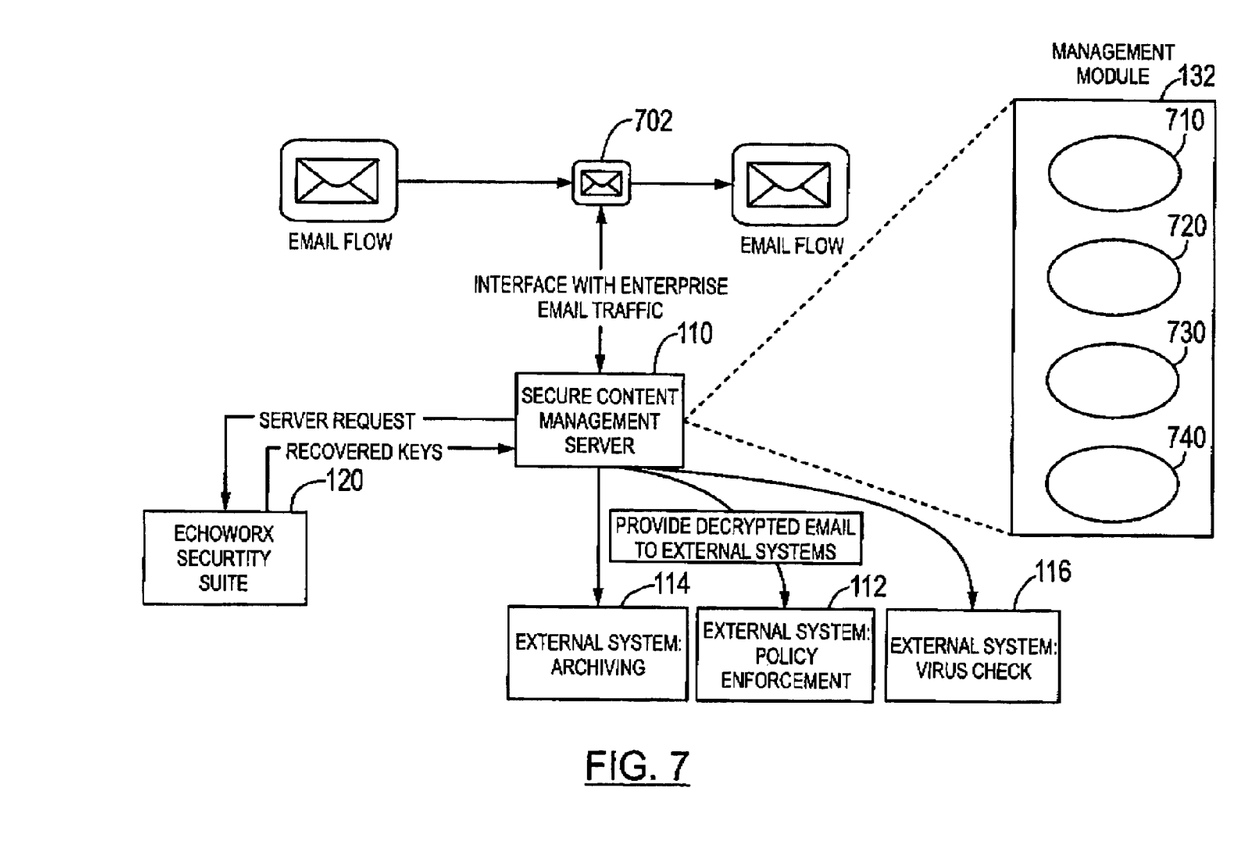
FIG. 7 shows in block diagram form an arrangement for the secure content management content server according to another embodiment of the invention.

Reference is next made to FIG. 7, which shows the secure content management server or SCM server 110 (FIG. 1) configured for an active mode of operation according to another embodiment of the invention. In the active mode of operation, the SCM server 110 includes a management module for example as indicated by reference 132 in FIG. 1. As shown in FIG. 7, the SCM server 110 is also provided with a message, e.g. email, interception module or listener module, indicated by reference 702. According to other embodiments, the SCM server 110 is configured to monitor other types of messages or communications with secured content, for example, secured instant messaging. In the active mode of operation, the management module 132, according to one embodiment, uses the email interception module 702 to monitor email traffic and decrypt email "on the fly" and manages the external content management systems (i.e. a message processor) in the handling or processing of the decrypted email, as will be described in more detail below. According to one embodiment, the management module 132 includes a software object 710 for controlling the email interception module 702, a software object 720 for receiving captured email from the email interception module 702, a software object 730 for releasing email to the email interception module 702. The management module 702 also includes a software object 740 for managing the external content management or message processing systems, for example, the policy enforcement system 112, the archiving system 114 and/or the virus scanner and spam filter system 116, as shown in FIG. 7.

In operation the management module 132 instructs the email interception module 702 to "listen". In response, the email interception module 702 monitors the email traffic in the email server and captures email which is then routed to the SCM server 110. Email which is not encrypted and/or not subject to policy enforcement may be released without further processing. Otherwise, the captured email is decrypted by the SCM server 110, for example, as described above. The decrypted or clear text email is then processed according to the policy enforcement rules. For example, the clear text email is scanned by the virus check system 116 and if virus clear (or sanitized), the clear text email is encrypted back to S/MIME and released by the SCM server 110. In another example, the clear text email is scrutinized for confidential information and if acceptable, the clear text email is re-encrypted by the SCM server 110 and released.

Figure 8:
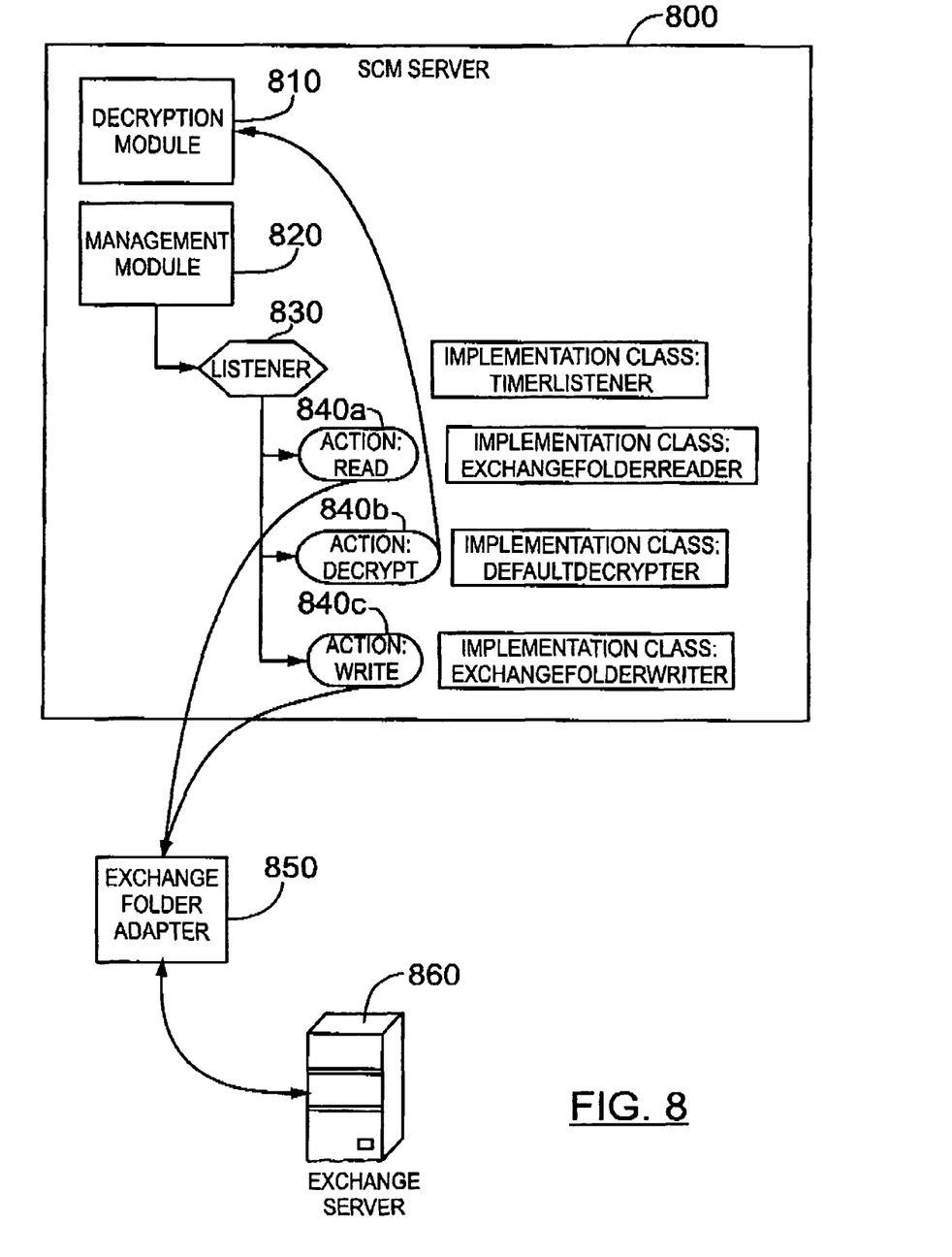
FIG. 8 shows in diagrammatic form implementation of a management module for the secure content management server according to an embodiment of the invention.

Reference is next made to FIG. 8, which shows in schematic form a secure content management server according to another embodiment of the invention and indicated generally by reference 800. The SCM server 800 includes a decryption module 810 and a management module indicated by reference 820. According to this embodiment, the management module 820 supports an extensible architecture comprising a listener 830 and a plurality of actions indicated generally by reference 840. The listener 830 is implemented as an event driven object that responds to certain trigger(s) and in response activates one or more or a sequence of the Actions 840. In the context of the SCM server 800, the listener 830 may comprise a timer event that "kicks-in" or triggers after a pre-determined period of time. The listener 830 may also be implemented as a custom class that responds to other event(s), such as "sniffing" emails (i.e. monitoring network communications and identifying and extracting messages such as secure email messages) over the enterprise network. The listener classes are implemented with the same interface and therefore the management module 820 can instantiate more than one listener dynamically during run-time. The Actions 840 are also defined by an interface that is implemented by classes to achieve a desired functionality. Actions are generally triggered by the listener(s) in the order that they are configured and the outcomes of the Actions are passed on to the next action dynamically. Actions include common implementation classes, or custom implementation classes, which comprise a stub to call external adapters, for example, on the same machine or on a different physical machine.

Referring to FIG. 8, the actions include an Action:Read 840a, an Action:Decrypt 840b and an Action:Write 840c. The listener 830 is implemented with Implementation Class:TimerListener. The Action:Read 840a is implemented with Implementation Class:ExchangeFolderReader. The Action:Decrypt 840b is implemented with Implementation Class:DefaultDecrypter. The Action:Read 840c is implemented with Implementation Class:ExchangeFolderWriter. According to this embodiment, email messages are read from and written to an exchange folder adapter 850 as shown in FIG. 8, which acts as a repository for the email exchange server 860.

Figure 9:
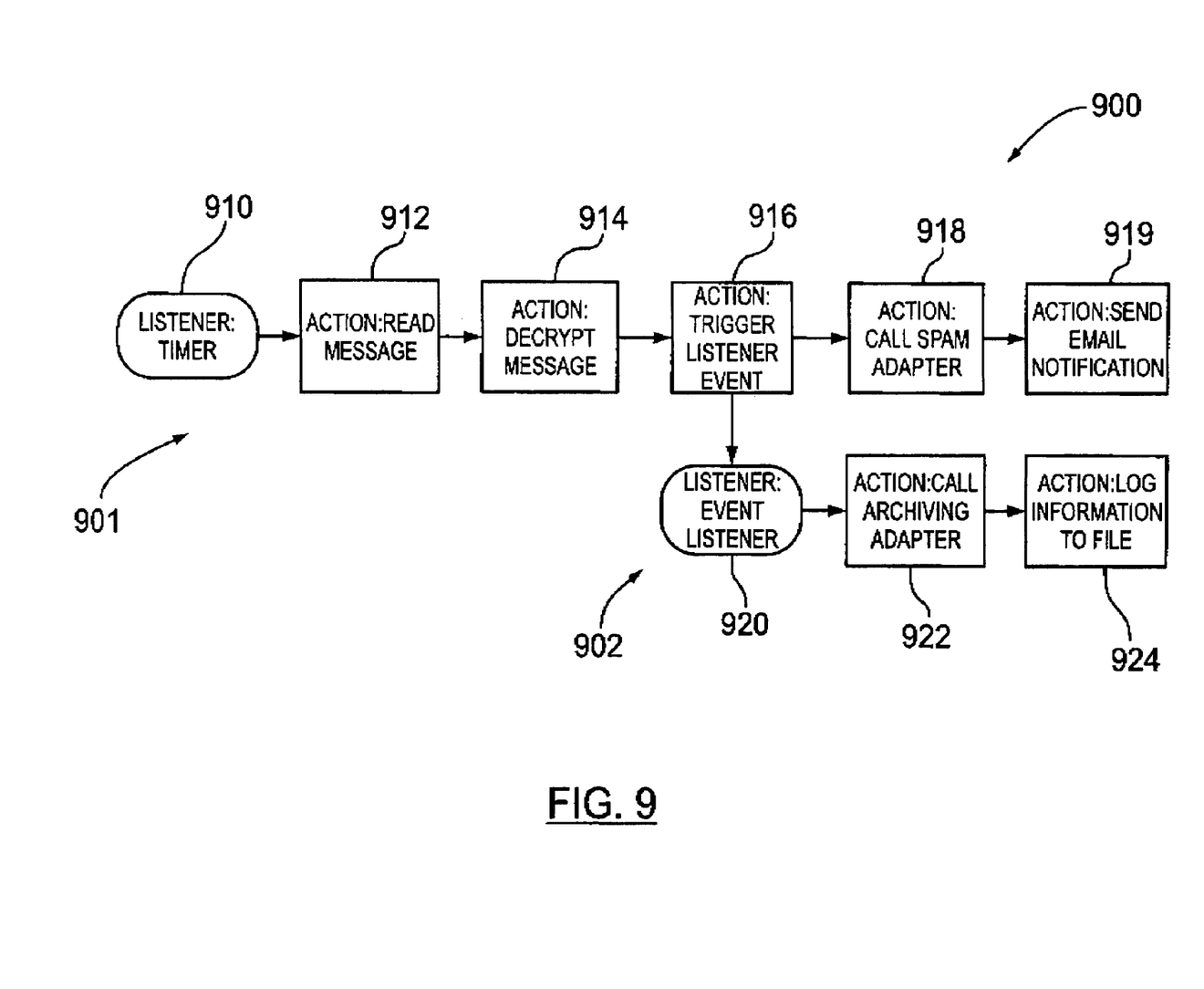
FIG. 9 shows exemplary execution threads for a process for scrutinizing messages for the secure content management server according to an embodiment of the invention.

Reference is next made to FIG. 9, which shows a management module implemented according to another embodiment of the invention and indicated generally by reference 900. The management module 900 comprises two listeners: a Listener:Timer 910 and a Listener:Event Listener 920. The first Listener:Timer 910 is associated with Action:Read Message 912, Action:Decrypt Message 914, Action:Trigger Listener Event 916, Action:Call Spam Adapter 918 and Action:Send Email Notification. The second Listener:Event Listener 920 is associated with Action:Call Archiving Adapter 922 and Action:Log Information to File 924. The first Listener 910 and associated Actions 912 to 919 comprise a first execution thread indicated generally by reference 901. The second Listener 920 and associated Actions 922 to 924 comprise a second execution thread indicated generally by reference 902. The second execution thread 902 is triggered by the Action:Trigger Listener Event 916.

In operation, the Listener:Timer 910 is triggered by a time-out (e.g. timer interrupt) and invokes the Action:Read Message 912, which reads (i.e. retrieves) an email message, for example, via the Exchange Folder Adapter 850 (FIG. 8), and passes the email message to the Action:Decrypt Message 914. The Action:Decrypt Message 914 calls the decryption module 124 (FIG. 1) to convert the S/MIME email message to a clear text MIME message, which is then passed to the Action:Trigger Listener Event 916. The Action:Trigger Listener Event 916 passes the MIME message to the Action:Call Spam Adapter 918 and also triggers the second Listener:Event Listener 920, which initiates execution of the second thread 902. The Action:Call Spam Adapter 918 calls the virus scanner and spam filter module 116 (FIG. 1) to scan the MIME message, and passes the result of the spam filter to the Action:Send Email Notification 919. The Action:Send Email Notification 919 sends a notification if the email message is spam. For the second execution thread 902, the Listener:Event Listener 920 receives the clear text MIME message from the Action:Trigger Listener Event 916 and passes it to the Action:Call Archiving Adapter 922. The Action:Call Archiving Adapter 922 calls the archiving system 114 (FIG. 1) and passes archive indication to the Action:Log Information to File 924 which logs the archive. Following a similar approach additional or different Listening triggers and/or actions may be configured to provide additional or other functionality for the SCM server.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A server for managing encrypted messages in a system having a key management server and a server for sending and receiving encrypted messages and a message content manager, said server comprising:

an interface for receiving an encrypted message from the message content manager;

a key module for storing a plurality of user-keys from the key management server, said user-keys being associated with a plurality of users on the message server, and said user-keys being encrypted, and said key module being configured to decrypt one or more of said plurality of user-keys utilizing one or more recovery authority keys, and said one or more recovery authority keys being associated with one or more recovery authorities;

a decryption module for decrypting the encrypted message into a decrypted message, said decryption module utilizing one of the decrypted user-keys associated with the user for the encrypted message; and an interface for transmitting said decrypted message to the message content manager for one or more message content processing functions.

2. The server as claimed in claim 1, wherein said recovery authority keys are encrypted with a first key associated with the recovery authority, and said encrypted recovery authority keys are further encrypted with a second key associated with the key management server.

3. The server as claimed in claim 2, wherein said encrypted recovery authority keys comprise a recovery key object, and the key management server is configured to decrypt said recovery key object utilizing said first key, wherein said first key comprises a key secured by the recovery authority, and said key module is configured to further decrypt said decrypted recovery key object utilizing said second key to provide said recovery authority keys in a decrypted form, wherein said second key comprises a Realm public key.

4. The server as claimed in claim 3, wherein said server includes a memory for storing said decrypted recovery authority keys in a clear text form.

5. The server as claimed in claim 3, wherein said server include a cache memory, and said key module is configured to retrieve one or more of said plurality of user-keys from the key management server and further configured to decrypt said retrieved user-keys and store said decrypted user-keys in said cache memory.

6. The server as claimed in claim 5, wherein said decrypted user-keys are stored in said cache memory during a start-up procedure.

7. The server as claimed in claim 5, wherein said server is configured to store said decrypted recovery authority keys in said memory during a startup procedure.

8. The server as claimed in claim 1, wherein said one or more recovery authorities comprise M recovery authorities and N recovery authority keys, and the key management server is configured to decrypt the keys utilizing M of the N recovery authority keys.

9. The server as claimed in claim 8, wherein said key module is configured to generate a recovery key object, said recovery key object comprising a combination of said recovery authority keys, and said key module being configured to encrypt said recovery key object using an administrator key and further configured to re-encrypt said recovery key object using a key provided by the key management server.

10. A method for handling encrypted messages for further processing in a communication system, said method comprising the steps of:
    capturing an encrypted message from the communication system;
    retrieving one or more user-keys for users of the communication system in response to a content management request from an administrator agent, said one or more user-keys being encrypted;
    decrypting said one or more retrieved user-keys utilizing one or more recovery authority keys, wherein said one or more recovery authority keys are secured by one or more recovery authorities;
    associating one of said decrypted user-keys with the user for the captured encrypted message;
    using said decrypted user-key to convert said captured encrypted message into a readable message; and
    applying one or more content management processes to said readable email message.

11. The method as claimed in claim 10, further including the step of encrypting said one or more recovery authority keys with a first key associated with an administrator and re-encrypting said one or more recovery authority keys with a second key associated with a key management system.

12. The method as claimed in claim 10, wherein said one or more recovery authority keys comprise a recovery key object, said recovery key object being encrypted using a first key obtained locally, and said recovery key object being re-encrypted using a second key obtained remotely.

13. The method as claimed in claim 10, wherein said step of applying one or more content management processes to said readable message comprises one or more of applying a policy rule, archiving, scanning for a virus and filtering for spam.

14. An apparatus for managing secure messages in a communication system, said apparatus comprising:
    means for capturing one or more of the secure messages in the communication system;
    means for retrieving a user-key associated with the secure message in response to a content management request from an administrator agent;
    means for decrypting said retrieved user-key utilizing a recovery key, said recovery key being secured by a recovery authority;
    means for converting said captured secured message into a form with readable content using said decrypted retrieved user-key; and
    means for performing content management processing of said converted secure message.

15. The apparatus as claimed in claim 14, wherein said recovery key is encrypted using an encryption key belonging to the recovery authority.

16. The apparatus as claimed in claim 15, wherein said recovery key is re-encrypted using a second encryption key from a key management module.

17. The apparatus as claimed in claim 16, further including a memory for storing said recovery key decrypted using said second encryption key and further decrypted using said encryption key.

18. The apparatus as claimed in claim 16, further including a cache memory for storing said decrypted retrieved user-key.

19. A system for processing encrypted messages in a communication system having a server for sending and receiving encrypted messages and a message processor, said system comprising:
    a monitor for monitoring messages on the message server and a module for capturing one Or more of said messages, and said one or more messages including one or more encrypted messages;
    a recovery key module for retrieving key parts from a key manager and including a key assembler for assembling keys associated with the users of the message server based on said key parts and one or more recovery keys, said one or more recovery keys comprising a recovery key object, wherein said recovery key object is secured by encryption with an administrator key and re-encryption with a key obtained from said key manager;
    a decryption engine for decrypting said encrypted messages into corresponding clear text messages based on one or more said assembled keys;
    a router for routing one or more of said clear text messages to a message processor for processing said clear text message.

20. The system as claimed in claim 19, wherein said monitor comprises a listener object and a read message action, and said listener object being responsive to a timer input for capturing one of said messages and said read message action being operable to read said captured message.

21. The system as claimed in claim 20, wherein said decryption engine includes a decrypt message action, said decrypt message action being operable to decrypt said captured message based on said key associated with said user.

22. The system as claimed in claim 21, wherein said router includes a call spam adapter action, said call spam adapter action being operable to invoke a spam adapter for scanning said decrypted message.

23. The system as claimed in claim 21, wherein said router includes another listener object, said listener object being responsive to an event input, and in response to said event input being operable to trigger a call archiving adapter action to archive said decrypted message.

24. A non-transitory storage medium having stored therein executable commands for execution on a processor when executing the commands in a communication system for performing:
   capturing an encrypted message from the communication system;
   retrieving one or more user-keys for users of the communication system in response to a content management request from an administrator agent, said one or more user-keys being encrypted;
   decrypting said one or more retrieved user-keys utilizing one or more recovery authority keys, wherein said one or more recovery authority keys are secured by one or more recovery authorities;
   associating one of said decrypted user-keys with the user for the captured encrypted message;
   using said decrypted user-key to convert said captured encrypted message into a readable message; and
   applying one or more content management processes to said readable email message.

25. The non-transitory storage medium as claimed in claim 24 having stored therein executable commands for execution on a processor, the processor when executing the command performing encrypting said one or more recovery authority keys with a first key associated with an administrator and re-encrypting said one or more recovery authority keys with a second key associated with a key management system.

26. The non-transitory storage medium as claimed in claim 24 having stored therein executable commands for execution on a processor, wherein said one or more recovery authority keys comprise a recovery key object, said recovery key object being encrypted using a first key obtained locally, and said recovery key object being re-encrypted using a second key obtained remotely.

27. The non-transitory storage medium as claimed in claim 24 wherein said content management related operations comprise one or more of applying a policy rule, archiving, scanning for a virus and filtering for spam.

* * * * *